(12) United States Patent
Haggander

(10) Patent No.: US 7,481,784 B2
(45) Date of Patent: *Jan. 27, 2009

(54) WALL STRUCTURE

(75) Inventor: Jan Haggander, Trollhattan (SE)

(73) Assignee: Volvo Aero Corporation, Trollhattan (SE)

( * ) Notice: Subject to any disclaimer, the term of this patent is extended or adjusted under 35 U.S.C. 154(b) by 0 days.

This patent is subject to a terminal disclaimer.

(21) Appl. No.: 10/904,764

(22) Filed: Nov. 26, 2004

(65) Prior Publication Data

US 2005/0086928 A1   Apr. 28, 2005

Related U.S. Application Data

(63) Continuation of application No. PCT/SE03/00877, filed on May 28, 2003.

(60) Provisional application No. 60/319,270, filed on May 28, 2002.

(30) Foreign Application Priority Data

May 28, 2002   (SE)   .................................... 0201595

(51) Int. Cl.
   *F02K 9/00*   (2006.01)
(52) U.S. Cl. ......................................... 601/257; 60/267
(58) Field of Classification Search .................... 60/257, 60/260, 200.1, 267; 29/890.01
   See application file for complete search history.

(56) References Cited

U.S. PATENT DOCUMENTS

| | | | |
|---|---|---|---|
| 2,976,679 A | 3/1961 | Dalgleish | |
| 3,043,103 A | 7/1962 | Dent et al. | |
| 3,190,070 A * | 6/1965 | Neu, Jr. ........................ | 60/267 |
| 3,595,025 A * | 7/1971 | Stockel et al. ................. | 60/267 |
| 3,630,449 A | 12/1971 | Butler | |
| 3,690,103 A * | 9/1972 | Dederra et al. ................ | 60/267 |
| 3,692,637 A * | 9/1972 | Dederra ...................... | 205/114 |
| 3,897,316 A | 7/1975 | Huang | |
| 4,582,678 A * | 4/1986 | Niino et al. .................... | 419/8 |
| 4,591,534 A | 5/1986 | Wagner et al. | |
| 4,781,019 A * | 11/1988 | Wagner ....................... | 60/260 |
| 5,233,755 A | 8/1993 | Vandendriessche | |
| 5,249,357 A * | 10/1993 | Holmes et al. ........... | 29/890.01 |
| 5,363,645 A * | 11/1994 | Pellet .......................... | 60/267 |

(Continued)

OTHER PUBLICATIONS

Hodgman, C., Weast, R., and Selby, S. "Handbook of Chemistry and Physics", Chemical Rubber Publishing, Cleveland, Ohio, 1956, pp. 2250-2253.*

*Primary Examiner*—William H Rodriguez
(74) *Attorney, Agent, or Firm*—Novak Druce + Quigg LLP

(57) ABSTRACT

A wall structure (2) and components incorporating such a wall structure that are intended to be exposed to high thermal loads. The wall structure (2) includes at least two layers; a first layer (5) and a second layer (6), the second layer (6) being located closer to a source of the thermal load than the first layer (5). The layers (5, 6) are arranged so that heat is allowed to be conducted from the second layer (6) to the first layer (5). Each of the first and second layers (5, 6) are adapted to carry a significant portion of a structural load, and the second layer (6) exhibits a higher thermal conductivity and/or a lower thermal expansion than the first layer (5) which reduces thermal strain in the wall structure (2).

20 Claims, 2 Drawing Sheets

U.S. PATENT DOCUMENTS

| | | | |
|---|---|---|---|
| 5,899,060 A * | 5/1999 | Schmidt | 60/267 |
| 6,182,442 B1 | 2/2001 | Schmidt et al. | |
| 6,442,931 B1 * | 9/2002 | Vasin et al. | 60/257 |
| 7,017,333 B2 * | 3/2006 | Haggander | 60/266 |
| 2003/0230071 A1 * | 12/2003 | Haggander | 60/257 |

* cited by examiner

WALL STRUCTURE

CROSS-REFERENCE TO RELATED APPLICATIONS

The present application is a continuation patent application of International Application No. PCT/SE03/00877 filed 28 May 2003 which was published in English pursuant to Article 21(2) of the Patent Cooperation Treaty, and which claims priority to (i) Swedish Application No. 0201 595-6 filed 28 May 2002 and (ii) U.S. Provisional Application No. 60/319,270 filed 28 May 2002. Said applications are expressly incorporated herein by reference in their entireties.

TECHNICAL FIELD

The invention generally relates to a wall structure intended for being exposed to a thermal load. In particular, the invention relates to a wall structure for use in a rocket engine component.

BACKGROUND ART

Rocket engines develop a considerable heat load and the walls of the combustion chamber and the nozzle used for expanding the gas are exposed to very high temperatures. An efficient cooling is needed to avoid that the walls melt or in other ways are destroyed. In liquid propellant rocket engines; i.e., rocket engines using liquid fuel, cooling is usually achieved by leading cool fuel such as hydrogen or kerosene in channels inside the walls and thus use the fuel as cooling medium.

The heating of the construction material of the wall leads to a thermal expansion of the material. With an intense heat load on the hot side of the wall and with simultaneous cooling from inside the wall, a significant temperature gradient develops in the wall. This leads to a thermal expansion gradient that causes a considerable thermal stress within the wall, which limits the service life of rocket components such as the thrust chamber, i.e. the combustion chamber and the nozzle. The most limiting location is the inner part of the wall in the combustion chamber; i.e., the hot side of the wall located between the cooling channels and the wall surface facing the combustion chamber.

Both reusable and non-reusable rocket engines need to withstand high thermal loads. Reusable rocket engines, however, need to withstand a repeated exposure to a thermal load as they experience a plurality of launchings; that is, such engines need to have a long, low cycle fatigue life. The better the resistance to low cycle fatigue loads, the more times it can be used.

The total strain of the inner part of the wall depends on the thermal gradient through this part of the wall and also on the thermal gradient through the whole wall, from the hot side to the cool side. By lowering the strain, the service life can be extended. A low strain in the inner part of the wall also leads to a lower strain in the outer part of the wall since the forces in the walls are each others force and reaction force.

Usually the fuel is hydrogen. A complication arising when using hydrogen as a cooling medium, however, is that metallic materials are often sensitive to hydrogen exposure which commonly results in a reduced material strength. This restricts options in material choice.

Materials with high heat conductivity reduce the thermal gradient and thereby the thermal strain in the wall structure. Copper and aluminum are materials with high heat conductivity, but the use of these materials is limited since the highest allowed operation temperature may be exceeded in phases of the flight cycle where coolant is not available such as in the reentry phase. Materials with low thermal expansion also lower the thermal strain in the wall structure. It is, however, difficult to find low thermal expansion materials that also are ductile, resistant to hydrogen exposure and suitable for processing.

A number of different wall structures have been previously proposed. In one structure the cooling medium is led through tubes with a circular cross section that are welded together parallel to each other. Such a construction is flexible in a direction perpendicular to the longitudinal axis of the tubes in that the thermal expansion can be absorbed by deflexion of the tubes that can take an oval cross-sectional form. However, the construction is rigid in the axial direction of the tubes. Another drawback is that the wavy topology of the construction leads to very high temperatures at hot spots at the crests of the tubes on the hot side of the wall.

In another structure, tubes with a rectangular cross section are welded together on the cold side, the outer side, of the wall. This structure has no parts that stick out from the hot side of the wall. Further, the construction enables a distance to be formed between the tubes on the inner side of the wall during a cooling period since the tubes are joined only at the outer side of the wall. This reduces the thermal stress during cooling. However, since distances are formed between the tubes the inner wall will not be smooth which leads to an increased friction and thus a lowered average flame velocity.

Another example is a so called sandwich structure in which a primary plate is, for example by milling, provided with cooling channels and a secondary plate is welded to the primary plate as a cover onto the cooling channels. In such a construction, the inner wall is continuous in a tangential direction and therefore the structure provides very little flexibility to reduce the strain arising from the thermal expansion.

It is also known to provide the inner wall with a thermal barrier coating using a material with low heat conductivity, such as a ceramic material, to insulate the load carrying metallic structure. The low heat conductivity of this material has the effect that the temperature in the coating increases for a constant thermal load. Due to the thermal expansion the coating will be strongly loaded in compression and, together with the high thermal load, this leads to flaking of the coating. A general drawback with such thermal barrier coatings in such applications as rocket engines is that the coated component acquires an additional weight.

DISCLOSURE OF THE INVENTION

A main objective of the present invention is to provide a wall structure that withstands an intense thermal load and has a longer service life compared to prior art. In principle, the invention concerns a wall structure intended for being exposed to a thermal load, comprising (including, but not necessarily limited to) at least two layers: a first layer and a second layer. The second layer is located closer to a source of the thermal load than the first layer, and the layers are arranged so that heat is allowed to be conducted from the second layer to the first layer. The invention is characterized in that each of the first and second layers are adapted to carry a significant portion of a structural load, and that the second layer exhibits a higher thermal conductivity and/or a lower thermal expansion than the first layer.

This design has the advantageous effect that it reduces the thermal strain and its effects in the wall structure which in turn extends the service life. In brief, this can be explained as follows: The first feature (i.e., that both layers carry a structural load) has the effect that the thickness of the wall can be kept at a minimum; that is, it is not necessary to increase the wall thickness just because the structure comprises two layers. The second feature can be divided into two parts. The first part is characterized by a higher thermal conductivity in the second layer which lowers both the temperature levels and the temperature gradient in the wall structure. Since the thermal strain depends on the temperature and the thermal expansion of the material, this will lower the absolute values of the thermal strain and make the thermal strain profile through the wall structure more uniform. The second part of the second feature concerns a lower thermal expansion in the second layer that reduces the expansion in the hottest part of the structure which both reduces the most extreme thermal strain and leads to a more uniform thermal strain profile. Both lowered strain values and a more uniform strain profile have a favorable effect on the service life of the wall structure.

A further advantage of using both layers for carrying the structural load is that no additional "dead weight" 0 is added to the construction, as for instance is the case with thermal barrier coatings. In addition, the absence of a thermal barrier coating makes the load carrying parts of the wall structure accessible for inspection. A further advantageous effect of lowered temperature levels is that it leads to enhanced material properties, such as higher structural strength.

In a first advantageous embodiment of the invention, the second layer exhibits both a higher thermal conductivity and a lower thermal expansion than the first layer. This way the advantageous effects of each of these material properties can interact and form an even better design.

In a second advantageous embodiment of the invention, the wall structure comprises cooling channels that are located on a side of the second layer that is opposite to that of the thermal source, the cooling channels being adapted for cooling medium through-flow. Cooling channels arranged this way cause a large temperature gradient in the wall structure which enhances the advantageous effect of the invention.

In a third advantageous embodiment of the invention, the cooling channels are located at a distance from the second layer. Such a design makes it possible to use a hydrogen sensitive material in the second layer also in situations where hydrogen is used as a cooling medium.

In a fourth advantageous embodiment of the invention, the cooling channels are located in connection to the first layer, preferably the cooling channels are located at least partly within the first layer. Such an arrangement gives a favorable design.

In a fifth advantageous embodiment of the invention, the first layer is essentially formed from a first metallic material, and the second layer is essentially formed from a second metallic material, the second metallic material having a higher thermal conductivity and/or a lower thermal expansion than the first metallic material. Since metal is a suitable construction material this gives a favorable construction.

In a sixth advantageous embodiment of the invention, the second layer contains ceramic particles. This way the thermal expansion of the second layer can be further reduced.

BRIEF DESCRIPTION OF THE DRAWINGS

The invention will now be described in more detail with reference to the appended drawings in which.

DETAILED DESCRIPTION OF THE INVENTION

Figure 1:
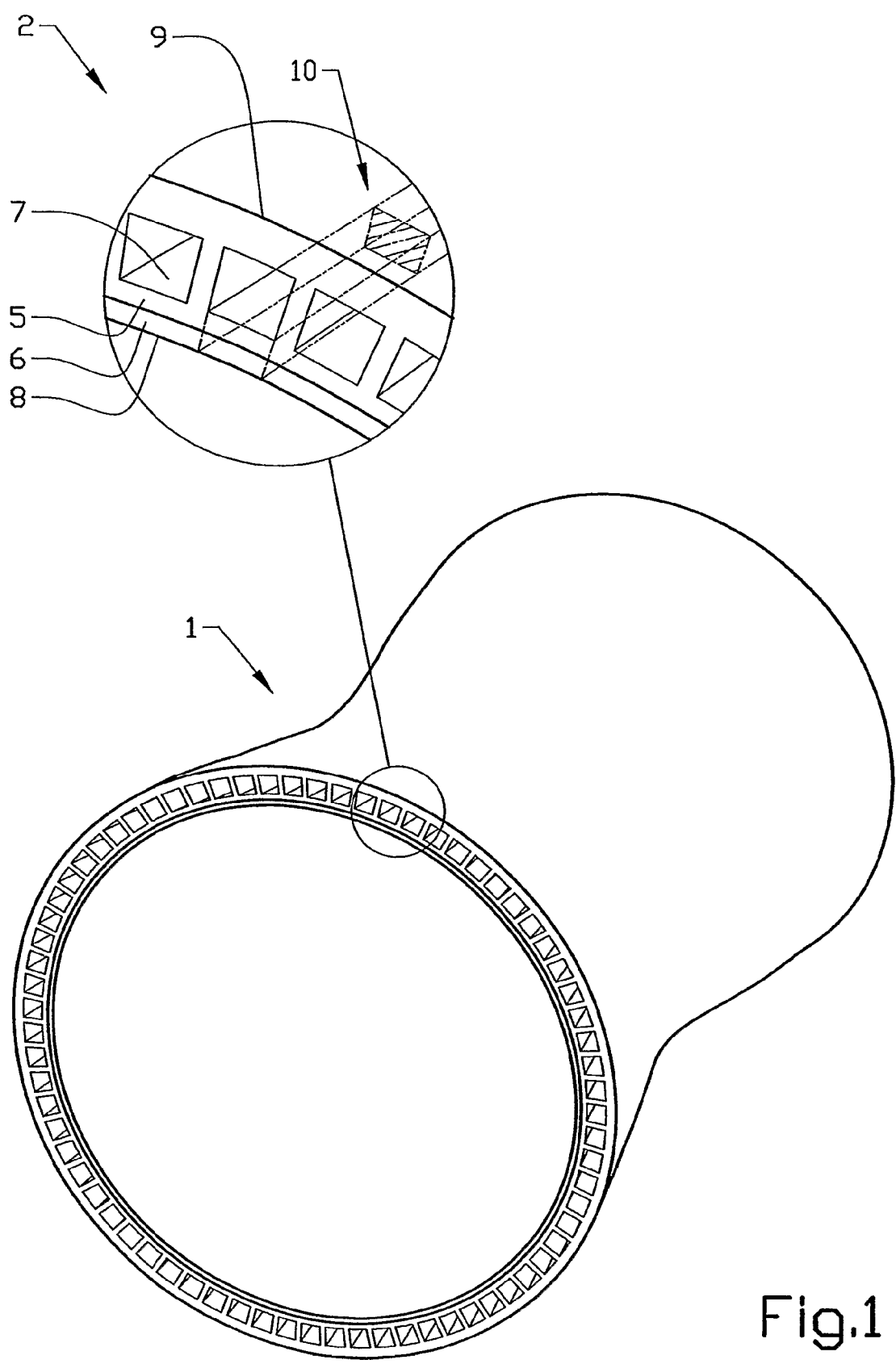
FIG. 1 shows an advantageous embodiment of the invention.

FIG. 1 shows an advantageous embodiment of the invention in which a wall structure 2 forms a thrust chamber 1. As shown in the magnified part of FIG. 1, the wall structure 2 comprises a first layer 5 and a second layer 6. The second layer 6 is located on a hot side 8 of the wall structure 2; i.e., the side of the wall structure 2 that faces a heat source that, at least occasionally, expose the wall structure 2 to a thermal load. In this case the heat source is the hot gases inside the thrust chamber. The first layer 5 is provided with cooling channels 7 that are adapted for through-flow of a cooling medium.

Each of the layers 5, 6 carry a significant portion of a structural load. In the embodiment shown in FIG. 1, the two layers 5, 6 have similar strength properties which means that the total thickness of the wall structure 2 does not have to be increased for the reason that the construction comprises two layers. Principally, if the thickness of the second layer 6 is increased by a certain value the thickness of the first layer 5 can be decreased by an equal value. Further, the two layers 5, 6 are joined to each other so that heat is allowed to be conducted from one layer to the other, and the second layer 6 exhibits a higher thermal conductivity and a lower thermal expansion than the first layer 5.

The structural load are loads carried by the structure in the form of stresses. The origin of the loads in the structure could for instance be pressure, thermal stress, mass forces (i.e. acceleration) and mechanical forces at interfaces. By saying that each of the layers 5, 6 are adapted to carry a significant portion of a structural load it is meant that both layers 5, 6 contribute to the support of the structure. This is in contrast to the previously mentioned prior art where the inner wall is provided with a thermal barrier coating that does not carry a significant portion of the structural load.

As the temperature rises in the thrust chamber 1 (i.e., as the thermal load is applied to the wall structure), the temperature rises in the wall structure 2 and a temperature gradient will develop in the wall structure 2. Naturally, the highest temperatures of the wall structure 2 will be found in the outermost parts of the second layer 6 that are located closest to the heat source.

In the direction towards the cooling channels 7 and the other, cooler, side 9 of the wall structure 2, the temperature will gradually decrease. The largest temperature gradient (i.e., the steepest temperature profile) in the wall structure 2 will naturally be found in the part between the hot side 8 and the cooling channels 7 through which a cooling medium flows. Such a part has been given the reference 10 in FIG. 1.

Generally, construction materials expand as the temperature increases; the higher the temperature, the larger the expansion. If this expansion cannot be totally absorbed by, for example, deformation of the construction, it gives rise to compression stress; that is, a negative thermal strain in the construction. The thermal strain in a certain point depends both on the temperature and the thermal expansion of the material. A thermal strain profile in a certain material will thus principally have the same shape as the temperature profile. A high thermal strain decreases the durability of the material. The invention lowers the thermal strain in the wall structure, or at least eliminates the most extreme values in the thermal strain profile. This is further described below.

Figure 2:
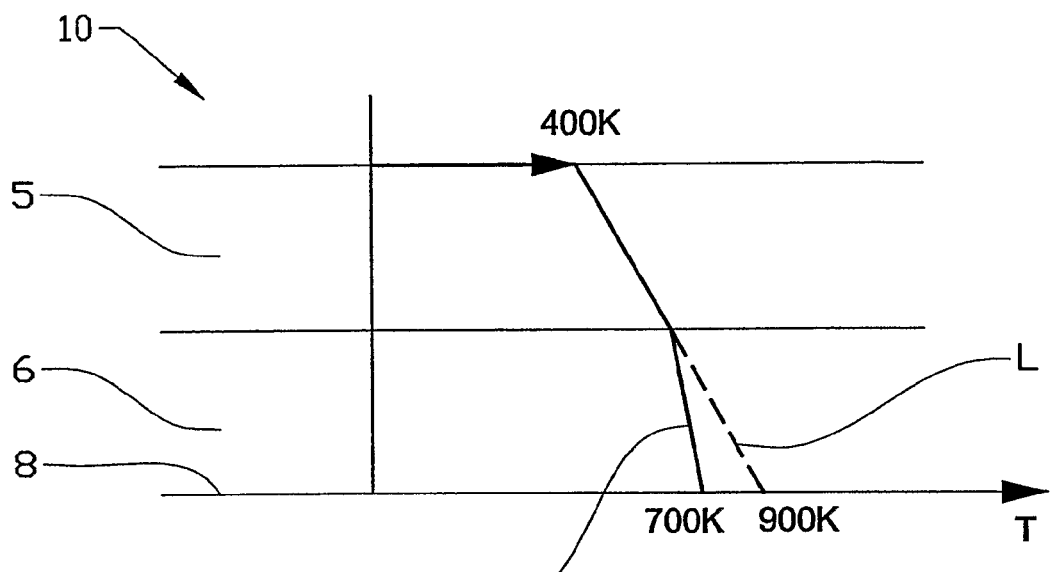
FIG. 2 graphically shows the advantageous effect of the invention in a temperature diagram.

FIG. 2 shows a typical temperature diagram over the part with the largest temperature gradient in the wall structure 2; i.e., part 10 in FIG. 1. The upper section of the diagram represents the first layer 5 and the lower section represents the second layer 6. A typical temperature profile of the part 10 during exposure to a thermal load is shown by a solid line K on the right hand side of the diagram. In order to clearly show the advantageous effect of the invention, the temperature profile for a construction of conventional single-layer type has been added to FIG. 2 for comparison. In this construction there is no second layer 6, instead the thickness of the first layer 5 has been increased as to replace the second layer 6 so that the total thickness is the same and so that the whole part 10 exhibits the same thermal conductivity and thermal expansion as the first layer 5. A dashed line L on the right hand side of the diagram shows the temperature profile for the conventional type of construction. As can be seen in FIG. 2, the temperature profile for the conventional construction is a straight line (dashed line L), whereas that for the wall structure 2 according to the invention has a different, advantageous, slope in the second layer 6 (solid line K) due to the high thermal conductivity of this layer. The temperatures in the high-temperature part of the temperature profile are thus lower in the wall structure 2, according to the invention, than in a construction of conventional type.

The typical temperature profile in FIG. 2 gives rise to a corresponding typical strain profile.

Figure 3:
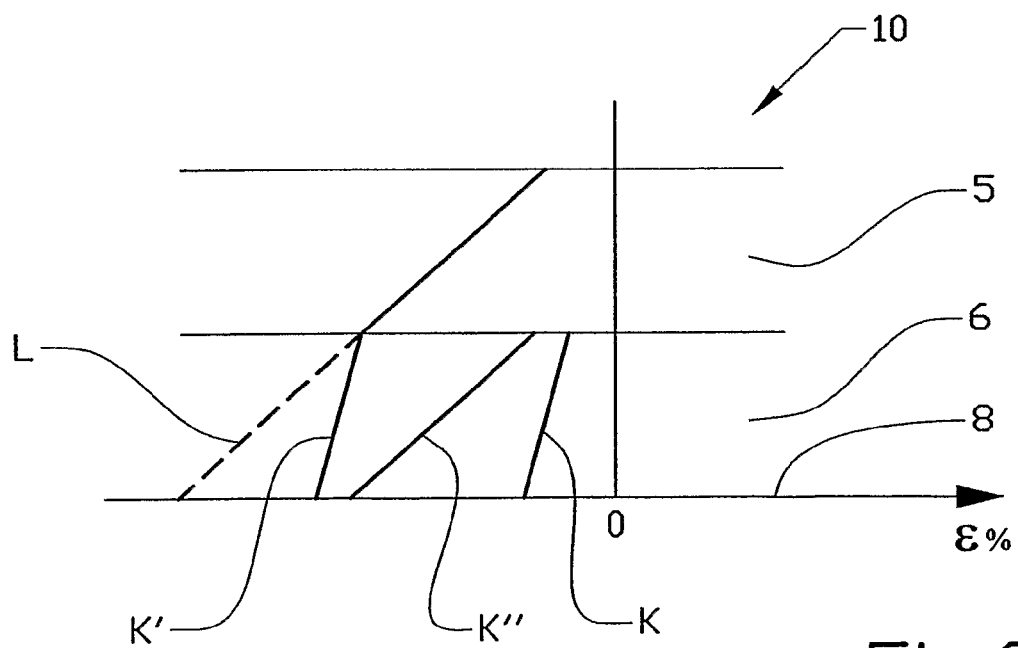
FIG. 3 graphically shows the advantageous effect of the invention in a strain diagram.

Such a typical strain diagram over the part 10 in FIG. 1 is shown in FIG. 3. The upper section of the diagram represents the first layer 5 and the lower section represents the second layer 6. As mentioned above, the second layer 6 exhibits both a higher thermal conductivity and a lower thermal expansion than the first layer 5. A typical strain profile of the part 10 during exposure to a thermal load is shown by a solid line K on the left hand side of the diagram. The negative value of the strain (S) is a result of compression forces caused by thermal expansion. In similarity with the temperature diagram shown in FIG. 2, a typical strain profile for a construction of conventional type has been added to FIG. 3 for comparison to clearly show the advantageous effect of the invention. In this construction there is no second layer 6, instead the thickness of the first layer 5 has been increased as to replace the second layer 6 so that the total thickness is the same and so that the whole part 10 exhibits the same thermal conductivity and thermal expansion as the first layer 5. A dashed line L on the left hand side of the diagram shows the temperature profile for the conventional type of construction. As can be seen in FIG. 3, the strain profile for the conventional construction is a straight line, whereas the strain profile for the wall structure 2 according to the invention both has a different, advantageous, slope and is moved towards zero strain in the second layer 6. The advantageous slope is due to the high thermal conductivity of the second layer 6, whereas the movement of the profile towards zero strain is due to the lower thermal expansion of the second layer. The thermal strain in the high-strain part of the strain profile is thus lower in the wall structure 2 according to the invention than in a construction of conventional type.

Two other lines, K' and K", are also shown in FIG. 3. Line K' represents a case in which the thermal expansion of the second layer 6 is similar to that of the first layer 5, whereas the thermal conductivity of the second layer 6 is higher than that of the first layer 5. Line K" represents another case in which the thermal conductivity of the second layer 6 is similar to that of the first layer 5, whereas the thermal expansion of the second layer 6 is lower than that of the first layer 5. As can be seen in FIG. 3, the thermal strain in the wall structure 2 is in both these cases lower than in the conventional type of structure (dashed line L). Thus, it is sufficient that the second layer 6 exhibits either a higher thermal conductivity or a lower thermal expansion than the first layer 5 to obtain the advantageous technical effect of decreasing the thermal strain in the wall structure 2 compared to a conventional type of construction. It is even possible to achieve the effect if the second layer 6 exhibits a thermal conductivity that is slightly lower than that of the first layer 5, provided that the thermal expansion of the second layer 6 is sufficiently much lower than that of the first layer 5.

Conversely, it is also possible to achieve the effect if the second layer 6 exhibits a thermal expansion conductivity that is slightly lower than that of the first layer 5, provided that the thermal conductivity of the second layer 6 is sufficiently much higher than that of the first layer 5. Of course, the largest effect is achieved if the second layer 6 exhibits both a higher thermal conductivity and a lower thermal expansion than the first layer 5, as the embodiment of the invention shown in FIG. 1 and as shown by line K in FIG. 3.

It is not necessary that the two layers 5, 6 have similar strength properties to make use of the invention. Thus, it is not necessary that the combined wall thickness of the first and the second layers 5, 6 equals that of the conventional single-layer type of construction as described above in relation to the dashed line L in FIGS. 2 and 3. The invention has an advantageous effect on the thermal strain also if the wall thickness is somewhat increased compared to the conventional construction, provided that the effect of using different material properties in the second layer 6 is sufficient. It is thus not necessary that the two layers 5, 6 are equally well adapted to carry the structural load since there is a possibility to increase the thickness of one or both of the two layers 5, 6. However, the advantageous effect of the invention is most pronounced if the wall thickness is kept at a minimum, and the effect decreases with increasing wall thickness. Naturally, reduction of the wall thickness is important in any case for keeping the weight low.

The two-layer structure, according to the invention, makes it possible to use a first material in the first layer 5 and a second material in the second layer 6 and thus to combine different physical properties of different materials in an advantageous way. Besides the combination of thermal properties described above, the invention makes it possible to combine properties related to e.g. cost and processing. A material that is suitable for being used in the second layer 6 due to its thermal properties may for instance be too costly, heavy or difficult to process to be used through-out the whole wall structure 2. According to the invention, such a material can be combined with another material that is less costly, lighter and more easily processed as to form the first layer 5.

It is not necessary for the use of the invention that the wall structure 2 be provided with cooling channels 7 or that a cooling medium intended for this particular purpose is used at all, but the advantages of the invention is enhanced in such a case, in particular if hydrogen is used as cooling medium. Firstly, the presence of both a heat source and a cooling medium gives rise to a large temperature gradient. In such a case it is particularly important to take actions to reduce the thermal strain in the wall structure. Secondly, a certain material may exhibit physical properties that are very suitable for being used in a wall structure of the type discussed here, except that the material is sensitive to exposure to hydrogen. According to the embodiment of the invention shown in FIG. 1, such a material can still be used in the second layer 6 as the cooling channels 7 is located at a distance from the second layer 6 so that the material constituting this layer will not come in contact with the cooling medium such as the hydrogen.

Preferably, the first layer 5 is formed from a first metallic material, and the second layer 6 is formed from a second metallic material, the second metallic material having a higher thermal conductivity and a lower thermal expansion than the first metallic material.

A suitable combination of metallic materials is to use austenitic stainless steel in the first layer 5 and ferriti-martensitic stainless steel in the second layer 6. An example is to use Nitronic40 in the first layer 5 and INCO 600 or Greek alloy in the second layer 6. Such a combination reduces the strain in the wall structure down to approximately 75% of what it would be with only Nitronic40 in both the layers. An even larger strain reduction can be obtained by using Nitronic40 in the first layer 5 and pure nickel in the second layer 6.

A reduction of the strain to 75% makes the service life significantly longer, approximately three times longer. Instead of extending the service life, a reduced strain can be utilized to simplify the manufacturing; e.g., by increasing tolerances or reduce the number of cooling channels, and thus reduce the manufacturing cost.

A typical thickness of the part 10, i.e. a typical length of the distance from the hot side 8 to the cooling channels 7, is in the range 0.6 to 0.9 mm. Preferably, the thickness of the second layer 6 is about half of the thickness of the part 10, i.e. around 0.4 mm.

In a further development of the embodiment of the invention according to FIG. 1, the second layer 6 contains ceramic particles in order to further decrease the thermal strain. Generally, a ceramic material exhibits a very low thermal expansion compared to a metallic material and by mixing such a material into the second layer 6 the thermal expansion of the second layer 6 is reduced. Many ceramic materials also exhibit satisfactory to excellent thermal conductivity properties. If the thermal conductivity of the ceramic material is low, the amount of ceramic material that can be mixed into the second layer 6 without loosing the advantageous thermal effect is limited. A very large fraction of ceramic material in the second layer 6 would lead to a considerable reduction in the ability of the second layer 6 to carry the structural load. In such a case the wall thickness needs to be increased which affects the thermal strain profile and adds weight to the wall structure 2. In certain situations one may allow an increased wall thickness provided that the thermal properties are improved to a sufficient extent.

A large number of different ceramic materials such as oxides, carbides and nitrides are suitable for being mixed into the second layer 6. If the second layer 6 is applied onto the first layer 5 by laser sintering, carbides and nitrides are preferred since oxides absorb too much of the laser energy. Examples of suitable ceramic materials are aluminum nitride, titanium nitride, aluminum carbide, titanium carbide and silicon carbide. Preferably, the shape of the ceramic particles incorporated into the second layer 6 is spherical in order to minimize the stress concentration at the cavity filled by the particle. The size of the ceramic particles is preferably much smaller than the thickness of the second layer 6.

A preferred method for manufacturing of the wall structure 2 according to FIG. 1 will now be described. The source material is a primary plate and in a first step of the manufacturing method the plate is shaped to a suitable form, for instance, a cone. In a second step the second layer 6 is applied to the primary plate using laser sintering of metal powder. The primary plate thus forms a part of the first layer 5 according to FIG. 1. In this second step it is important that the thickness of the applied second layer 6 in every point exceeds a certain minimum value. In a third step the second layer 6 is machined, preferably by turning work, to acquire a uniform thickness. In a fourth step the primary plate, i.e. the part of the first layer 5, is milled from the cool side 9 of the wall structure 2 as to form grooves that later will form cooling channels 7.

In a fifth step a secondary plate is welded to the primary plate, i.e. to the part of the first layer 5, as a cover onto the grooves/cooling channels 7. Using the same material for both the primary plate and the secondary plate, these two plates together form the first layer 5 according to FIG. 1. Of course, it is possible to use different materials in the primary and the secondary plates.

If a ceramic material is to be mixed into the second layer 6, a ceramic powder is preferably mixed with the metallic powder in the second step.

Laser sintering is an advantageous technique since it gives a good adhesion to the primary plate; two pieces can virtually be integrated to form one piece. Additionally, laser sintering forms a dense and strong material.

As an alternative to laser sintering it is possible to use for instance electrodeposition or plasma spraying to apply the second layer 6 onto the primary plate. Another alternative is to apply the second layer 6 during plate rolling and thus to start out the manufacturing method from a rolled compound sheet metal that contains both the first and the second layers 5, 6.

Still another alternative is to shape the primary plate into a suitable form and use explosive cladding to apply the second layer 6 onto the primary plate.

The invention is not limited to the above described embodiments, but a number of modifications are possible within the frame of the patent claims. For instance, the wall structure could comprise additional layers with different material properties. As an example, the cover onto the grooves/cooling channels 7 could me made of another material to decrease the strain caused by the temperature gradient through the whole wall; i.e., from the hot side 8 to the cool side 9. Additional layers could also be located next to, or between the first and the second layers 5,6. Using different material properties in these additional layers it would be possible to form a multi-layer structure to further decrease the negative effects of the thermal strain in the wall.

In some applications, it may be advantageous to cover the inside of the cooling channels 7 with a material that is insensitive to the cooling medium.

Further, the wall structure according to the invention is not limited to rocket engine components, it could also be used in other applications where a considerable heat load is developed, such as combustion chambers, jet engines and turbines.

What is claimed is:

1. A wall structure intended for being exposed to a thermal load, comprising:
    at least two layers: a first layer bonded in substantial face-to-face contact with a second layer, said second layer being located closer to a source of said thermal load than said first layer and said layers being arranged so that heat is allowed to be conducted from the second layer to the first layer and wherein said wall structure comprises cooling channels located within the first layer at a radial distance outside the second layer; and
    each of said first and second layers being adapted to carry a significant portion of a structural load, and the second layer exhibiting at least one of a higher thermal conductivity and a lower thermal expansion than the first layer.

2. The wall structure as recited in claim 1, wherein said cooling channels are adapted for conveying cooling medium therethrough.

3. The wall structure as recited in claim 2, wherein said cooling channels are located at least partly within the first layer.

4. The wall structure as recited in claim 1, wherein the first layer is formed essentially from a first metallic material, and the second layer is formed essentially from a second metallic material, said second metallic material having at least one of a higher thermal conductivity and a lower thermal expansion than the first metallic material.

5. The wall structure as recited in claim 4, wherein the second layer contains ceramic particles.

6. A wall structure intended for being exposed to a thermal load, comprising:
   at least two layers: a first layer bonded in continuous face-to-face contact with a second layer, said second layer being located closer to a source of said thermal load than said first layer and said layers being arranged so that heat is allowed to be conducted from the second layer to the first layer; and
   each of said first and second layers being adapted to carry a significant portion of a structural load, and the second layer exhibiting at least one of a higher thermal conductivity and a lower thermal expansion than the first layer and wherein said wall structure comprises cooling channels located within the first layer at a radial distance outside the second layer.

7. The wall structure as recited in claim 6, wherein said cooling channels are adapted for conveying cooling medium therethrough.

8. The wall structure as recited in claim 7, wherein said cooling channels are located at least partly within the first layer.

9. The wall structure as recited in claim 6, wherein the first layer is formed essentially from a first metallic material, and the second layer is formed essentially from a second metallic material, said second metallic material having at least one of a higher thermal conductivity and a lower thermal expansion than the first metallic material.

10. The wall structure as recited in claim 9, wherein the second layer contains ceramic particles.

11. A rocket engine component comprising a wall structure intended for being exposed to a thermal load, said wall structure comprising:
    at least two layers: a first layer bonded in substantial face-to-face contact with a second layer, said second layer being located closer to a source of said thermal load than said first layer and said layers being arranged so that heat is allowed to be conducted from the second layer to the first layer and wherein said wall structure comprises cooling channels located within the first layer at a radial distance outside the second layer; and
    each of said first and second layers being adapted to early a significant portion of a structural load, and the second layer exhibiting at least one of a higher thermal conductivity and a lower thermal expansion than the first layer.

12. The rocket engine component as recited in claim 11, wherein said cooling channels are adapted for conveying cooling medium therethrough.

13. The rocket engine component as recited in claim 12, wherein said cooling channels are located at least partly within the first layer.

14. The rocket engine component as recited in claim 11, wherein the first layer is formed essentially from a first metallic material, and the second layer is formed essentially from a second metallic material, said second metallic material having at least one of a higher thermal conductivity and a lower thermal expansion than the first metallic material.

15. The rocket engine component as recited in claim 14, wherein the second layer contains ceramic particles.

16. A rocket engine component comprising a wall structure intended for being exposed to a thermal load, said wall structure comprising:
    at least two layers: a first layer bonded in continuous face-to-face contact with a second layer, said second layer being located closer to a source of said thermal load than said first layer and said layers being arranged so that heat is allowed to be conducted from the second layer to the first layer; and
    each of said first and second layers being adapted to carry a significant portion of a structural load, and the second layer exhibiting at least one of a higher thermal conductivity and a lower thermal expansion than the first layer and wherein said wall structure comprises cooling channels located within the first layer at a radial distance outside the second layer.

17. The rocket engine component as recited in claim 16, wherein said cooling channels are adapted for conveying cooling medium therethrough.

18. The rocket engine component as recited in claim 17, wherein said cooling channels are located at least partly within the first layer.

19. The rocket engine component as recited in claim 16, wherein the first layer is formed essentially from a first metallic material, and the second layer is formed essentially from a second metallic material, said second metallic material having at least one of a higher thermal conductivity and a lower thermal expansion than the first metallic material.

20. The rocket engine component as recited in claim 19, wherein the second layer contains ceramic particles.

* * * * *